UNITED STATES PATENT OFFICE.

SADAKICHI SATOW, OF SENDAI, JAPAN.

PROCESS OF MANUFACTURING VEGETABLE PROTEID SUBSTANCES.

1,427,645.     Specification of Letters Patent.     Patented Aug. 29, 1922.

No Drawing. Continuation of application Serial No. 131,468, filed November 15, 1916. This application filed August 20, 1918. Serial No. 250,633.

*To all whom it may concern:*

Be it known that I, SADAKICHI SATOW, a subject of the Emperor of Japan, residing at Sendai, Japan, have made a certain new and useful Invention in Process of Manufacturing Vegetable Proteid Substances, of which the following is a specification.

This invention relates to vegetable proteids and the process of manufacturing the same from vegetable substances, such as corn, cereals, leguminous products or other proteid containing material, and is a continuation of my application Serial No. 131,468, filed November 15, 1916.

The object of the invention is to provide vegetable proteid substances of improved quality and a simple, efficient and economical process of manufacturing the same from vegetable substances, such as cereals, leguminous products or other material for food purposes or for use in the manufacture of celluloid-like substances, linoleum-like substances, lacquer, varnish, artificial rubber, artificial leather and the like.

Further objects of the invention will appear more fully hereinafter.

In accordance with my invention I take the soja bean or other proteid containing substance, and dry it in any desired way, for example by placing the material in a revolving cylinder. In a great many uses of the proteid of the vegetable material, where a light color is not desired in the product to be manufactured from the proteids, the skin or covering of the vegetable material employed may be retained, but where a light color of the manufactured product is desired, the outer skin of the material is first removed in any desired way. In accordance with my invention I next flatten out the material employed whether soja bean or other vegetable substance, for example, by passing the same through rollers. This flattens the material and breaks down the cellular structures thereof, but does not remove or crush out the oil contained therein. If the material selected contains a high percentage of oil, it is desirable and necessary to remove the oil from the mass, and therefore I next treat the mass in any desired manner to remove the oil. This may be done in many different ways. One efficient way is to remove the oil by treating the mass after being flattened, as above explained, with a suitable solvent for oil, such as benzine. By first flattening the mass and thereby crushing the cellular structure, the oil of the mass is more readily and completely removed by the action of the benzine. When the benzine has removed the oil, it is then necessary to remove the remaining benzine from the mass. Heretofore this has been done by subjecting the mass to direct steaming. I have found, however, that the steaming is undesirable in that, due to the presence of moisture and high temperatures, the proteids of the mass become injured, thus lowering greatly the quality and the yield of the proteids. I have found that it is essential for securing good quality and the best yield of the proteids to avoid the presence of moisture and high temperatures as much as possible. This can be done either by using dry air of moderate temperature or vacuum. In either case the temperature of the mass under treatment should preferably be kept under 40° C. When air is used it may or may not be heated and it is passed into the cylinders containing the benzine-treated-mass and is then passed to a condenser to remove the benzine, and from there to a heater to be reheated if heated air is employed, and utilized over again. By thus circulating the air and at the same time agitating the mass, I not only effect a more complete removal of the benzine, but I also minimize the loss of the solvent, and also decrease the time and labor required in carrying out the process. The product of this last operation is called hereinafter by the term "meal." The meal obtained by this process is perfectly white or slightly yellow in color, while that obtained by the usual method of steaming is dark yellow or brownish. The superior quality of the proteid product, which is the object to which the present invention is directed, depends upon the superior quality of the meal. The meal procured as above described is of superior quality, and physically speaking, it possesses a pleasant odor; it possesses little or no tendency to mould, it has the appearance of being perfectly dry, and is white in color as above stated; while, chemically speaking, it retains the proteids more nearly in their natural state. The meal thus obtained is subjected to one of the following operations in order to separate out the proteids in the form of precipitates.

According to one method, the meal is placed in a suitable vessel, and treated with an alkaline solution, such as a dilute solution of caustic or carbonated alkali or ammonia. The resulting liquid containing the proteids together with a quantity of impurities, such as saccharocolloids, fibres, and others, in colloidal or suspensoidal state, is subjected either to direct precipitation or to further purification, according to the conditions prevailing and the purpose aimed at. The purification of the liquid can be effectively carried out either by mechanical means, such as filtration, centrifuging, or the like, or by physico-chemical means, such as fractional precipitation, fractional solution of precipitated impure proteids, or the like, or, finally, by chemical means by converting one or more components into other chemical compounds with different properties, which enable their separation.

The clarification and purification of the proteids and the solutions from which they are obtained as above described is a very important step in carrying out my process because the character of the resulting proteid product and of the commercial products to be made therefrom is dependent upon the state of purity and quality in which the proteids are recovered. I have found that it is exceedingly difficult to recover the proteids in their pure state or in the state in which their quality is not impaired either by contamination with other and deleterious substances or by the steps and methods employed in effecting the purification of them. I have found that in order to secure the best results the solutions obtained from the mass of raw material, and which solutions contain the proteids, should be purified and clarified into a transparent clear solution before recovery of the proteids therefrom. I have described in general terms various means to secure this result but in amplification of the description of said means I will now set forth more specifically the means I have found to be essential to the best results.

The colloidal solutions obtained as above described contain the proteids and also various impurities of colloidal or suspensoidal nature, such as saccharocolloids and gelatinized hemicellulose, fibre, or the like. I have found that if the colloidal solution is subjected only to filtration, or only to centrifuging, there is a failure to secure a transparent clear solution thereby indicating a failure to eliminate the undesired suspensoidal or other colloidal impurities, with the result of loss of transparency in the commercial product manufactured from the proteids recovered from the turbid solution. I have found, in the case of filtration, for example, that the mucid gelatinized impurities quickly choke up the filter material thereby resulting in a failure to secure the desired results or requiring constant renewal or cleansing of the filter material which is slow, expensive and greatly undesirable, and moreover, even with frequent renewals of the filter material the liquid treated remains turbid or translucent, and not a clear transparent solution. In carrying out my invention I have found it necessary, according to the mechanical method of purification above referred to, to subject the turbid colloidal liquid, first, to the action of a high speed centrifugal separator to effect a separation and removal of the dirty mucilaginous substances of colloidal or suspensoidal nature. I then pass the remaining liquid through a wood pulp or a sand filter. If as a result of these operations the liquid still remains more or less turbid I then subject it to fractional precipitation by adding a small quantity of sulphuric or sulphurous acid, permitting the liquid to stand to allow the recipitates to settle down, by which action impurities suspended in the liquid are carried down with the precipitate. The liquid is then drawn off or decanted and again filtered into a clear transparent state.

According to the chemical method of effecting purification of the colloidal proteidal liquid by converting one or more of the colloidal components contained therein into other chemical compounds, as above described, the proteids are completely precipitated from the liquid along with the colloidal and suspensoidal impurities. This precipitation is effected with an acid such as sulphuric acid or acetic acid. The acid required to effect the precipitation must be supplied very carefully in order to avoid an excess of the acid, and consequently to avoid any tendency of the proteids to redissolve in the acid solution. The solution is then allowed to stand to permit the precipitate to settle down. The supernatant solution is then decanted or otherwise drawn off. The vegetable proteids contained in the precipitate are then dissolved in dilute acid, such as sulphurous or hydrochloric acid. The precipitated impure colloids or suspensoids remain undissolved, but, at the same time, their colloidal nature is altered so as to enable them to be easily separated out from the mass by filtration or otherwise. During this step of dissolving the vegetable proteids in the weak acid solution agitation of the precipitated mass should be avoided as otherwise the proteidal acid solution will be rendered turbid or milky white and difficult to filter into a clear transparent solution.

In the cases above described, a clear transparent solution containing the vegetable proteids is obtained from which the pure proteids are precipitated.

The liquid obtained by purification as above described is transparent water white or pale yellow in color. The precipitation of the alkaline liquid is carried out either by adding acid, such as sulphuric, sulphurous, acetic or phosphoric acid to the liquid, or by means of ferment, such as lactic or acetic, thus precipitating proteids as completely as possible.

According to another method, the meal is treated with water, which extracts a quantity of saccharocolloids, fibre and the proteids in the form of colloids or suspensoids. The liquid is separated from the meal residue and subjected either to direct precipitation or to further purification. If the purification is desired, the liquid is made alkaline by adding caustic or carbonated alkali, or ammonia, which dissolves the suspensoids or proteids. The further treatment is just the same as in the case of the preceding method.

According to another method, the meal is treated with an aqueous salt solution, such as of sodium chloride, ammonium sulphate or the like, which acts as an extracting agent of proteids from the meal. The liquid thus obtained is subjected to further purification, such as centrifuging and filtering, if desired, and finally to dialysis. The salt passes through the membrane of the dialyser, while the proteids remain within the membrane in the form of precipitates.

The precipitate obtained as above described whether obtained by one or another of the above described methods is allowed to settle and the supernatant liquid is drawn off, and the settled precipitate is then pressed into cakes, and if desired the cakes may be dried and powdered. The product obtained is termed hereinafter "refined proteid" and is employed in the manufacture of a great variety of articles such as non-inflammable celluloid-like substances, lacquer, varnish, artificial leather, artificial rubber, linoleum-like substances, and all uses where vegetable proteid may be employed.

It will be observed that in carrying out my invention I avoid the use of formalin, the use of which results in the production of an exceedingly inert condensation product of proteids with formalin, which neither dissolves in water, organic solvents or aqueous solution of alkalis, acids, or salts, nor is acted upon by usual chemical or physical agents. It is obtained in a powder form and as it possesses neither plasticity nor flexibility nor adhesiveness, it therefore cannot be worked for manufacturing plastic and flexible celluloid-like substances or articles, and owing to its inability to be brought again into the form of a solution it cannot be worked for manufacturing various commercial products such as varnish, linoleum-like substances, lacquer, or artificial leather, artificial rubber, and the like, and it is essential for manufacturing such last named useful articles, that the proteids are, or can be changed into a form which is soluble in organic or inorganic solvents, and easily acted upon by chemical or physical agents.

It will also be observed that I avoid the use of coagulants such as aluminum sulphate or like metal compounds for obtaining the proteid product according to my invention. When such a metal compound is used the proteids pass into a combination with metal and form an inert and insoluble compound, which is similar in its undesirable properties to the condensation products just described, and cannot therefore be employed in the manufacture of celluloid-like substances, varnish, linoleum, lacquer, and the like, nor artificial leather, rubber and the like.

The proteid product, obtained according to my invention, when in wet condition, is white in color, tasteless, odorless, plastic and sticky when kneaded, while in dry condition, it is white or pale yellow in color, tasteless, odorless and plastic, but does not become sticky even when kneaded with water, except when an alkali, an acid or other proteid solvent is also added. Chemically, the proteid product obtained as above described, whether in wet or in dry condition, shows all characteristic reactions of vegetable proteids, is soluble in all proteid solvents, and when dissolved in alkalis and acids, respectively, it forms alkali salts and acid salts, respectively. It evolves ammonia gas when heated with hydroxide of alkali, or of alkaline earth metals, and changes into a yellow mass when treated with concentrated nitric acid. It is easily rendered transparent, is adhesive, and can be easily molded into permanent shape. When dissolved in suitable solvents it forms derivations of proteids which are flexible, elastic, adhesive, tough, and strong, and which do not crack while drying, thus producing products well suited for the manufacture of various useful commercial articles where flexibility, elasticity, adhesiveness, toughness and strength are desirable qualities.

Having now described in detail the process of obtaining vegetable proteid in accordance with my invention, what I claim as new and useful, and of my own invention, is,—

1. In the production of refined vegetable proteids, the process which consists in extracting with a liquid at a temperature below 40° C. the vegetable proteid containing material, then centrifuging and then filtering the extract to obtain a clarified transparent clear liquid, then fractionally precipitating the resulting clarified liquid to remove foreign matter therefrom the refined vegetable proteids from the resulting clarified transparent clear liquid.

2. In the production of refined vegetable proteids, the process which consists in extracing with a liquid vegetable proteid containing material, then centrifuging and then filtering the extract, then fractionally precipitating the filtered liquid to remove the foreign matter therefrom, then filtering the fractionally precipitated liquid to secure a clarified transparent clear solution, and finally separating the refined vegetable proteids from the resulting clear transparent liquid.

3. In the production of vegetable proteids, the process which consists in treating proteid containing material with an oil solvent to remove the oil constituent thereof, then agitating the mass and circulating dry air therethrough, and finally separating the proteids from the remaining mass.

4. In the production of vegetable proteids, the process which consists in crushing the cellular structure of proteid containing material and removing any oil content of the crushed mass, then extracting with an alkaline solution and at a temperature below 40° C. the soluble constituents of the mass, then centrifuging and then filtering the liquid to produce a clear transparent solution, and finally precipitating the proteids from the solution.

5. In the production of vegetable proteids, the process which consists in crushing the cell structure of proteid containing material then treating said crushed material with an oil solvent to remove the oil constituent thereof, then removing the oil solvent in the absence of moisture and high temperature, then extracting in liquid form at a temperature below 40° C. with caustic soda the proteid contents of the remaining mass and then precipitating with an acid the proteids contained in the solution.

In testimony whereof I have hereunto set my hand on this day of June 26 1918 A. D., 1918.

SADAKICHI SATOW.